US012228864B2

(12) United States Patent
Tagawa et al.

(10) Patent No.: US 12,228,864 B2
(45) Date of Patent: Feb. 18, 2025

(54) CHARGING DEVICE, CARTRIDGE, AND IMAGE FORMING APPARATUS

(71) Applicant: FUJIFILM Business Innovation Corp., Tokyo (JP)

(72) Inventors: Yuki Tagawa, Kanagawa (JP); Fuyuki Kano, Kanagawa (JP); Takuya Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/446,179

(22) Filed: Aug. 8, 2023

(65) Prior Publication Data

US 2024/0264548 A1 Aug. 8, 2024

(30) Foreign Application Priority Data

Feb. 3, 2023 (JP) ................................ 2023-015412

(51) Int. Cl.
*G03G 15/02* (2006.01)

(52) U.S. Cl.
CPC ..... *G03G 15/0225* (2013.01); *G03G 15/0233* (2013.01); *G03G 2215/022* (2013.01)

(58) Field of Classification Search
CPC ........... G03G 15/0225; G03G 21/0058; G03G 15/0258
See application file for complete search history.

(56) References Cited

U.S. PATENT DOCUMENTS

| | | | | |
|---|---|---|---|---|
| 10,761,449 B1 * | 9/2020 | Narita | G03G 15/0258 | |
| 2014/0099141 A1 * | 4/2014 | Nishimura | G03G 15/0225 | 399/100 |
| 2022/0137544 A1 * | 5/2022 | Ebe | G03G 15/0225 | 399/350 |

FOREIGN PATENT DOCUMENTS

| | | | |
|---|---|---|---|
| JP | 2009-145487 A | 7/2009 | |
| JP | 2011-013427 A | 1/2011 | |
| JP | 2018-159862 A | 10/2018 | |
| JP | 2021157041 A * | 10/2021 | G03G 21/0017 |

OTHER PUBLICATIONS

English Translation of JP 2021157041 (Year: 2021).*

* cited by examiner

*Primary Examiner* — Jessica L Eley
(74) *Attorney, Agent, or Firm* — Sughrue Mion, PLLC

(57) ABSTRACT

A charging device includes: a charging member that rotates in contact with a charged body and charges the charged body; and a cleaning member that comes into contact with the charging member and rotates in conjunction with the charging member, in which the cleaning member includes a foam elastic layer in which a band-shaped foam elastic member is spirally disposed with a pitch, and a diameter of a tip end portion of a cell skeleton protruding to a surface of the foam elastic layer is 50 μm or less, and a peripheral speed ratio of the cleaning member to the charging member is 0.3 or more and 0.7 or less.

16 Claims, 5 Drawing Sheets

FIG. 5

| | WOUND SHAPE OF FOAM ELASTIC MEMBER | DIAMETER OF TIP END PORTION OF CELL SKELETON | PERIPHERAL SPEED RATIO | DEFORMATION RATE OF THICKNESS OF ELASTIC LAYER | THICKNESS OF CONTAMINANT DEPOSITION LAYER | DENSITY UNEVENNESS |
|---|---|---|---|---|---|---|
| EXAMPLE 1 | SPIRAL | 30 μm | 0.3 | 20% | 1.5 μm | A |
| EXAMPLE 2 | SPIRAL | 30 μm | 0.5 | 13% | 1.0 μm | A |
| EXAMPLE 3 | SPIRAL | 30 μm | 0.7 | 10% | 1.8 μm | A |
| COMPARATIVE EXAMPLE 1 | SPIRAL | 30 μm | 0.2 | 25% | 2.8 μm | C |
| COMPARATIVE EXAMPLE 2 | SPIRAL | 30 μm | 0.8 | 8% | 2.5 μm | B |
| COMPARATIVE EXAMPLE 3 | SPIRAL | 30 μm | 1 | 5% | 3.0 μm | C |
| COMPARATIVE EXAMPLE 4 | NON-SPIRAL | 30 μm | 0.5 | 30% | 2.7 μm | C |
| EXAMPLE 4 | SPIRAL | 50 μm | 0.5 | 10% | 2.0 μm | A |
| COMPARATIVE EXAMPLE 5 | SPIRAL | 80 μm | 0.5 | 8% | 3.2 μm | C |
| COMPARATIVE EXAMPLE 6 | NON-SPIRAL | 30 μm | 0.6 | 25% | 2.5 μm | B |

CHARGING DEVICE, CARTRIDGE, AND IMAGE FORMING APPARATUS

CROSS-REFERENCE TO RELATED APPLICATIONS

This application is based on and claims priority under 35 USC 119 from Japanese Patent Application No. 2023-015412 filed Feb. 3, 2023.

BACKGROUND

(i) Technical Field

The present invention relates to a charging device, a cartridge, and an image forming apparatus.

(ii) Related Art

JP2011-013427A discloses a charging device including a cylindrical charging member and a cylindrical cleaning member that has at least a sponge-like surface layer and cleans a surface of the charging member by rotating in contact with the charging member.

JP2009-145487A discloses a charging device including a cylindrical charging member, a cylindrical charging member cleaning member for cleaning a surface of the charging member while being rotated in contact with and following the charging member, and a moving unit that moves at least one of the charging member or the charging member cleaning member in an axial direction thereof by a predetermined width.

JP2018-159862A discloses a cleaning device including: a cleaning member that has an elastic layer provided on a shaft portion to come into contact with a rotating charging body and cleans the charging body while rotating; a first bearing member that rotatably supports one end portion of the shaft portion and a second bearing member that rotatably supports the other end portion of the shaft portion; and a moving mechanism that is supported by the first bearing member and the second bearing member and periodically moves the shaft portion in an axial direction of the shaft portion as the cleaning member rotates.

SUMMARY

In order to clean deposits (for example, toner, external additives, and discharge products) adhering to a surface of a columnar charging member, a charging device including a cleaning member that removes deposits from an outer peripheral surface of the charging member by rotating in contact with the outer peripheral surface of the charging member.

Aspects of non-limiting embodiments of the present disclosure relate to a charging device, a cartridge, and an image forming apparatus that have an improved ability to remove deposits adhering to a charging member, compared a case where a cleaning member in which an outer peripheral surface is a flat plate-shaped elastic layer is used.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a charging device including: a charging member that rotates in contact with a charged body and charges the charged body; and a cleaning member that comes into contact with the charging member and rotates in conjunction with the charging member, in which the cleaning member includes a foam elastic layer in which a band-shaped foam elastic member is spirally disposed with a pitch, and a diameter of a tip end portion of a cell skeleton protruding to a surface of the foam elastic layer is 50 μm or less, and a peripheral speed ratio of the cleaning member to the charging member is 0.3 or more and 0.7 or less.

BRIEF DESCRIPTION OF THE DRAWINGS

Exemplary embodiment(s) of the present invention will be described in detail based on the following figures, wherein:

FIG. 5 is a table showing a relationship between configuration contents in Examples 1 to 4 and Comparative Examples 1 to 6 and density unevenness which is an evaluation result of each example.

DETAILED DESCRIPTION

Figure 1:
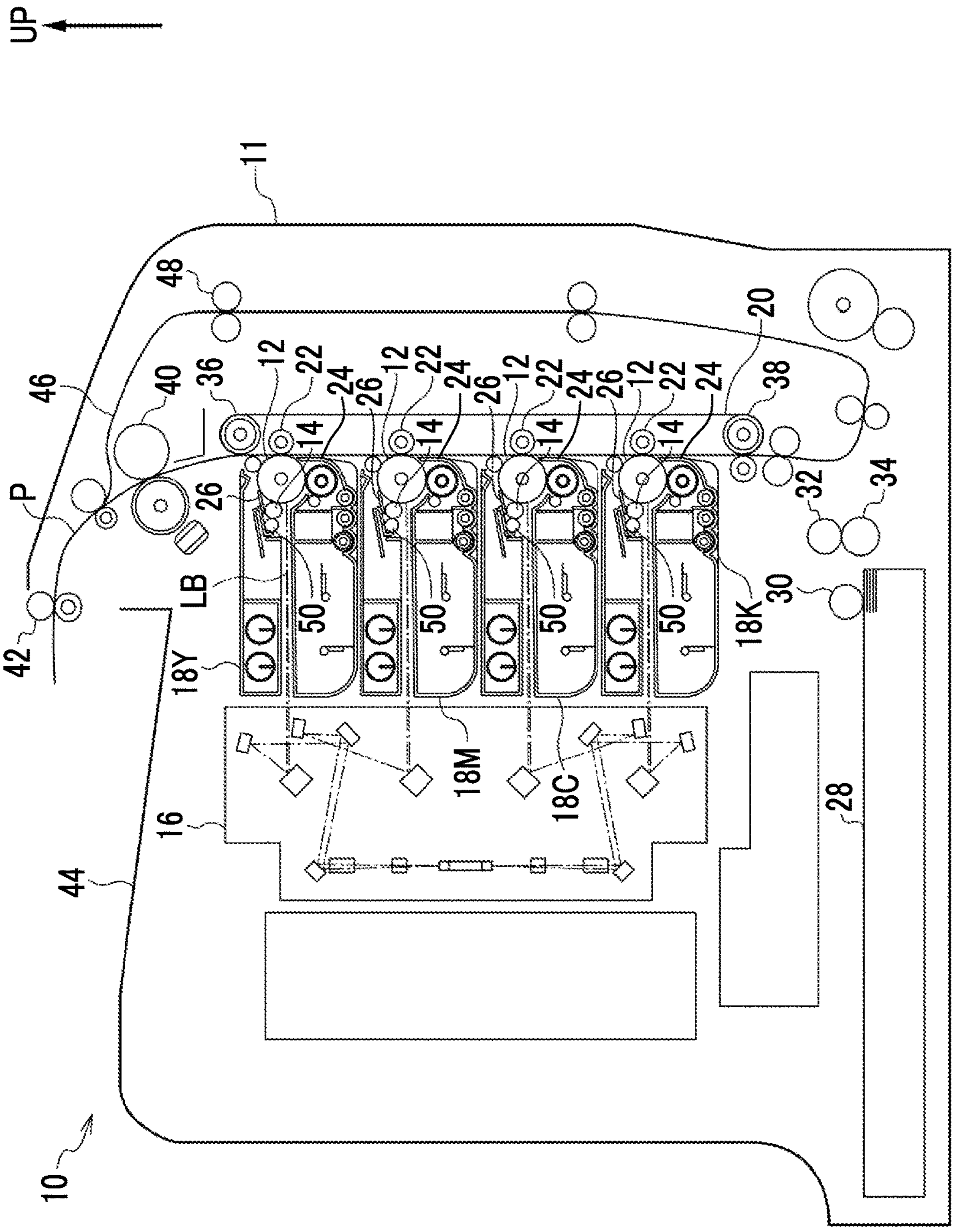
FIG. 1 is a schematic configuration view showing an image forming apparatus according to an exemplary embodiment of the present invention.

Hereinafter, an exemplary embodiment of the present invention will be described in detail with reference to the drawings. An image forming apparatus 10 according to the exemplary embodiment is, for example, as shown in FIG. 1, a tandem type full-color image forming apparatus, and in FIG. 1, an arrow UP is an upward direction of the image forming apparatus 10. In addition, components having the same function may be assigned the same reference numeral (reference numeral in which alphabetic characters are omitted). In addition, the drawings used in the following description are all schematic, and the relationship between respective dimensions of elements, the ratio between the elements, and the like shown in the drawings do not always coincide with the reality. In addition, even between a plurality of drawings, the relationship between the respective dimensions of the elements, the ratio between the elements, and the like do not always coincide with each other. In addition, even between the plurality of drawings, elements that are substantially the same are assigned the same reference numeral, description of the elements is provided in the drawings in which the elements first appear, and the description is omitted in the subsequent drawings unless otherwise necessary.

First, an overall configuration of the image forming apparatus 10 will be described. As shown in FIG. 1, the image forming apparatus 10 has an apparatus body 11. Inside the apparatus body 11, process cartridges 18K, 18C, 18M, and 18Y corresponding to black (K), cyan (C), magenta (M), and yellow (Y) are provided in this order from below. In the following description, the process cartridges 18K, 18C, 18M, and 18Y may be collectively referred to as a process cartridge 18.

Each process cartridge 18 includes a photoreceptor 12 as an example of an image holding body (charged body) capable of holding an image, a charging device 15 (see FIG. 2) having a charging roll 14 as an example of a charging member and a cleaning device 50, and a developing device 24. Each process cartridge 18 can be attached to and detached from the apparatus body 11.

Figure 3:
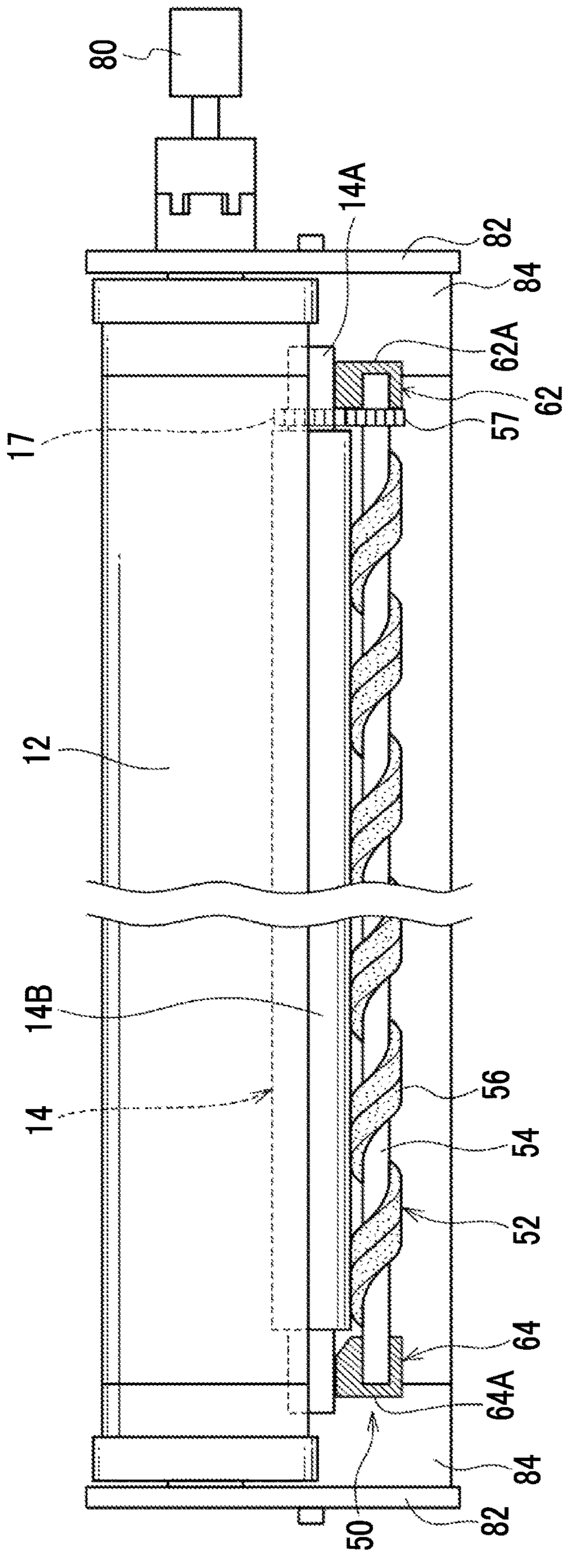
FIG. 3 is a schematic front view showing a configuration of a cleaning device according to a first exemplary embodiment.

Both end portions of the photoreceptor 12 in a rotation axis direction thereof are rotatably supported by side plates 82 (see FIG. 3). An outer peripheral surface of the photoreceptor 12 is charged by the charging roll 14 disposed in contact with the outer peripheral surface, and is then exposed to a laser beam LB emitted from an exposure device 16 disposed downstream of the charging roll 14 in a rotation direction of the photoreceptor 12. Accordingly, an electrostatic latent image corresponding to image information is formed on the outer peripheral surface of the photoreceptor 12.

The electrostatic latent images formed on the outer peripheral surfaces of the photoreceptors 12 are respectively developed by the developing devices 24 of black (K), cyan (C), magenta (M), and yellow (Y) into toner images of the corresponding colors. That is, by performing charging, exposing, and developing processes on each of the outer peripheral surfaces of the photoreceptors 12 of black (K), cyan (C), magenta (M), and yellow (Y), the toner images respectively corresponding to black (K), cyan (C), magenta (M), and yellow (Y) are respectively formed on the outer peripheral surfaces of the photoreceptor 12 of the corresponding colors.

On the other hand, recording paper P is taken out from a paper storage unit 28 by a take-out roll 30, and is transported to a transport belt 20 by a transport roll 32 and a transport roll 34. The transport belt 20 is wound in a state where tension is applied to a drive roll 36 and a driven roll 38, and is configured so that a side of the transport belt 20 facing each photoreceptor 12 is moved upward from below by a rotational drive of the drive roll 36. A transfer roll 22 corresponding to each photoreceptor 12 is disposed on an inner peripheral surface side of the transport belt 20.

Therefore, the toner images of black (K), cyan (C), magenta (M), and yellow (Y) respectively formed on the outer peripheral surfaces of the photoreceptors 12 are sequentially transferred from the outer peripheral surfaces of the photoreceptors 12 to the recording paper P transported by the transport belt 20 at transfer positions at which the transport belt 20 supported by the transfer rolls 22 and the photoreceptors 12 face each other. The recording paper P on which the toner image is transferred from the outer peripheral surface of each photoreceptor 12 is transported to a fixing device 40 and is heated and pressed so that the toner image is fixed on the recording paper P.

Thereafter, in a case of one-sided printing, the recording paper P on which the toner image is fixed is discharged onto a discharge unit 44 provided in an upper portion of the image forming apparatus 10 by a discharge roll 42. On the other hand, in a case of two-sided printing, a trailing edge portion of the recording paper P having a front surface on which the toner image is fixed by the fixing device 40 is sandwiched by the discharge roll 42, and then the discharge roll 42 rotates in a reverse direction such that the recording paper P is transported to a transport path 46 for two-sided printing.

Then, the recording paper P of which front and back sides have been reversed by being transported by the transport roll 48 disposed on the transport path 46 is transported to the transport belt 20 again, and a toner image is transferred from the outer peripheral surface of each photoreceptor 12 to a back surface of the recording paper P. The toner image of the recording paper P in which the toner image is transferred to the back surface of the recording paper P is fixed by the fixing device 40, and the recording paper P having the back surface on which the toner image is fixed is discharged onto the discharge unit 44 by the discharge roll 42.

Residual toner, paper dust, and the like remaining on the outer peripheral surface of the photoreceptor 12 after a process of transferring the toner image is removed by a cleaning blade 26 disposed downstream of the transfer position in the rotation direction of each photoreceptor 12 each time each photoreceptor 12 makes one revolution. Accordingly, the outer peripheral surface of each photoreceptor 12 is prepared for the next image forming process.

Next, the cleaning device 50 having the charging roll 14 and a cleaning roll 52 as an example of a cleaning member that cleans the charging roll 14 will be described.

Figure 2:
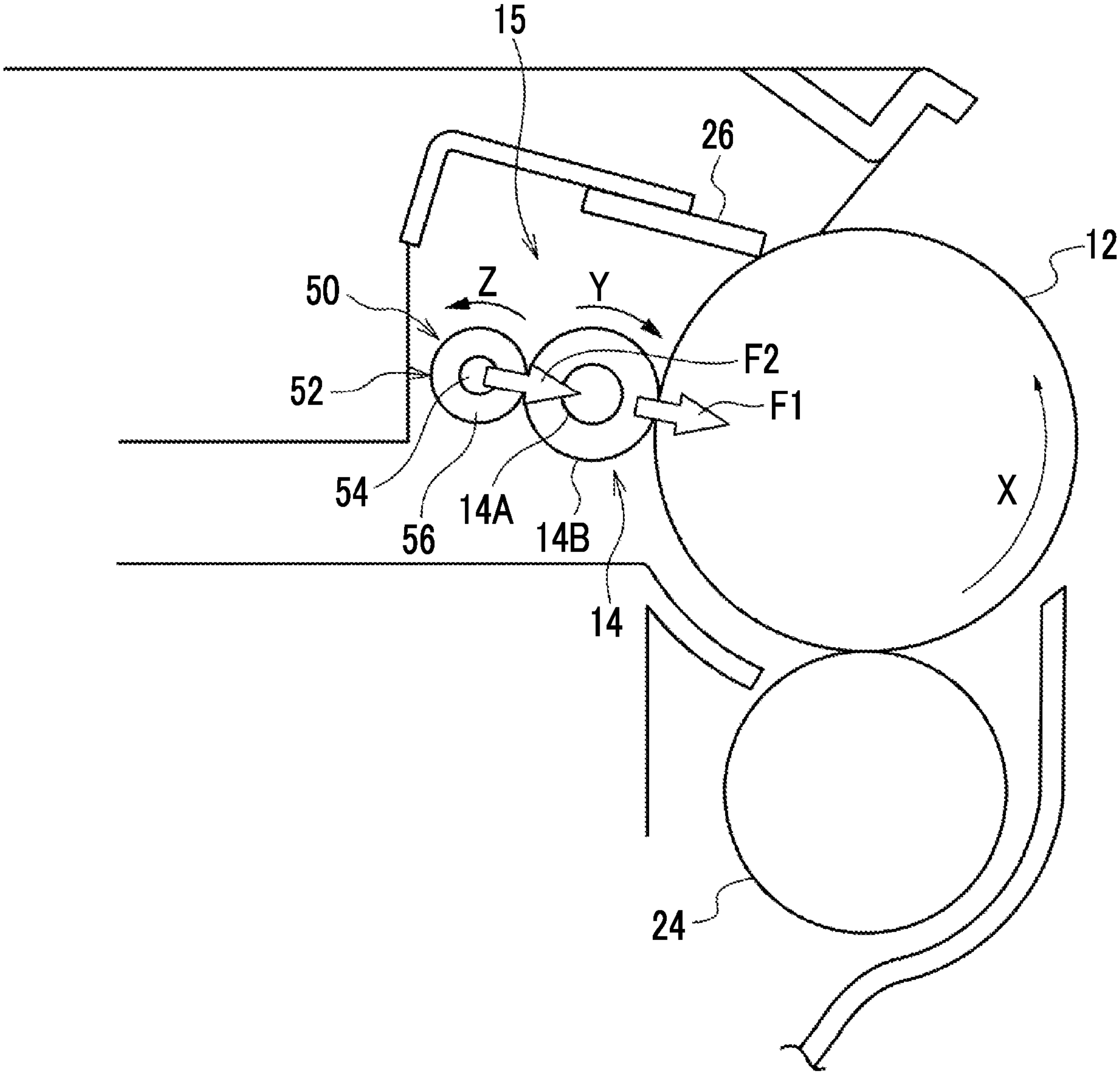
FIG. 2 is a schematic configuration view showing a cleaning device according to the exemplary embodiment of the present invention as viewed in an axial direction.

As shown in FIGS. 2 and 3, for example, the charging roll 14 is formed in a roll shape in which an elastic layer 14B is formed around a shaft 14A which is an example of a shaft core, and both end portions of the shaft 14A are rotatably supported by support members (not shown). The elastic layer 14B of the charging roll 14 is pressed against the outer peripheral surface of the photoreceptor 12 by a load F1 (see FIG. 2) applied to both end portions of the shaft 14A, and forms a nip portion by elastically deforming along the outer peripheral surface of the photoreceptor 12.

In addition, as shown in FIG. 2, the charging roll 14 rotates in an arrow Y direction following the rotation of the photoreceptor 12 as the photoreceptor 12 is driven to rotate in an arrow X direction by a motor 80 (see FIG. 3). The cleaning roll 52 is in contact with the charging roll 14 on a side opposite to the photoreceptor 12, and rotates in an arrow Z direction following the rotation of the charging roll 14.

In addition, an elastic layer 56 of the cleaning roll 52, which will be described later, is pressed against an outer peripheral surface of the elastic layer 14B of the charging roll 14 by a load F2 (see FIG. 2) applied to both end portions of a shaft 54, which will be described later, by a pair of bearing members 62 and 64 (see FIG. 3), which will be described later, and forms a nip portion by elastically deforming along the outer peripheral surface of the elastic layer 14B. The cleaning roll 52 is also configured to suppress bending of the charging roll 14.

As a material of the shaft 14A of the charging roll 14, there is a metal such as free-cutting steel or stainless steel having conductivity, and a surface treatment method or the like is appropriately selected depending on an application such as slidability. The elastic layer 14B of the charging roll 14 is, for example, a conductive foam elastic layer, and an elastic material forming the conductive foam elastic layer is formed, for example, by dispersing a conductive agent in a rubber material.

The elastic layer 14B of the charging roll 14 may have a single-layer structure or a laminated structure including a plurality of different layers having a plurality of functions. In addition, a surface layer may be formed on the outer peripheral surface of the elastic layer 14B. The surface layer may be any of a resin layer, a rubber layer, and the like, and is not particularly limited.

As shown in FIG. 3, the cleaning device 50 has the cleaning roll 52 formed in a roll shape. The cleaning roll 52 includes the shaft 54, which is an example of a shaft core, and the elastic layer 56 spirally wound around an outer peripheral surface of the shaft 54.

The shaft 54 is disposed along a rotation axis direction (hereinafter, simply referred to as "axial direction") of the charging roll 14. An axial length of the shaft 54 is formed to be longer than an axial length of the elastic layer 14B in the charging roll 14. That is, one end portion in the axial direction and the other end portion in the axial direction of the shaft 54 extend axially outward from one end portion in an axial direction and the other end in the axial direction of the elastic layer 14B of the charging roll 14, respectively.

As a material of the shaft 54, there are a metal such as free-cutting steel or stainless steel, and a resin such as polyacetal (POM).

The elastic layer 56 is a foam elastic layer made of a material having bubbles, and is made of a material that restores an original shape thereof even after being deformed by an applied pressure of, for example, 100 Pa. Examples of the material of the elastic layer 56 include foam elastic members made of a resin such as polyurethane such as an ester-based polyurethane or an ether-based polyurethane, polyethylene, polyamide, or polypropylene. A diameter of a tip end portion of a cell skeleton protruding to a surface of the elastic layer 56 is configured to be 50 μm or less.

Figure 4:
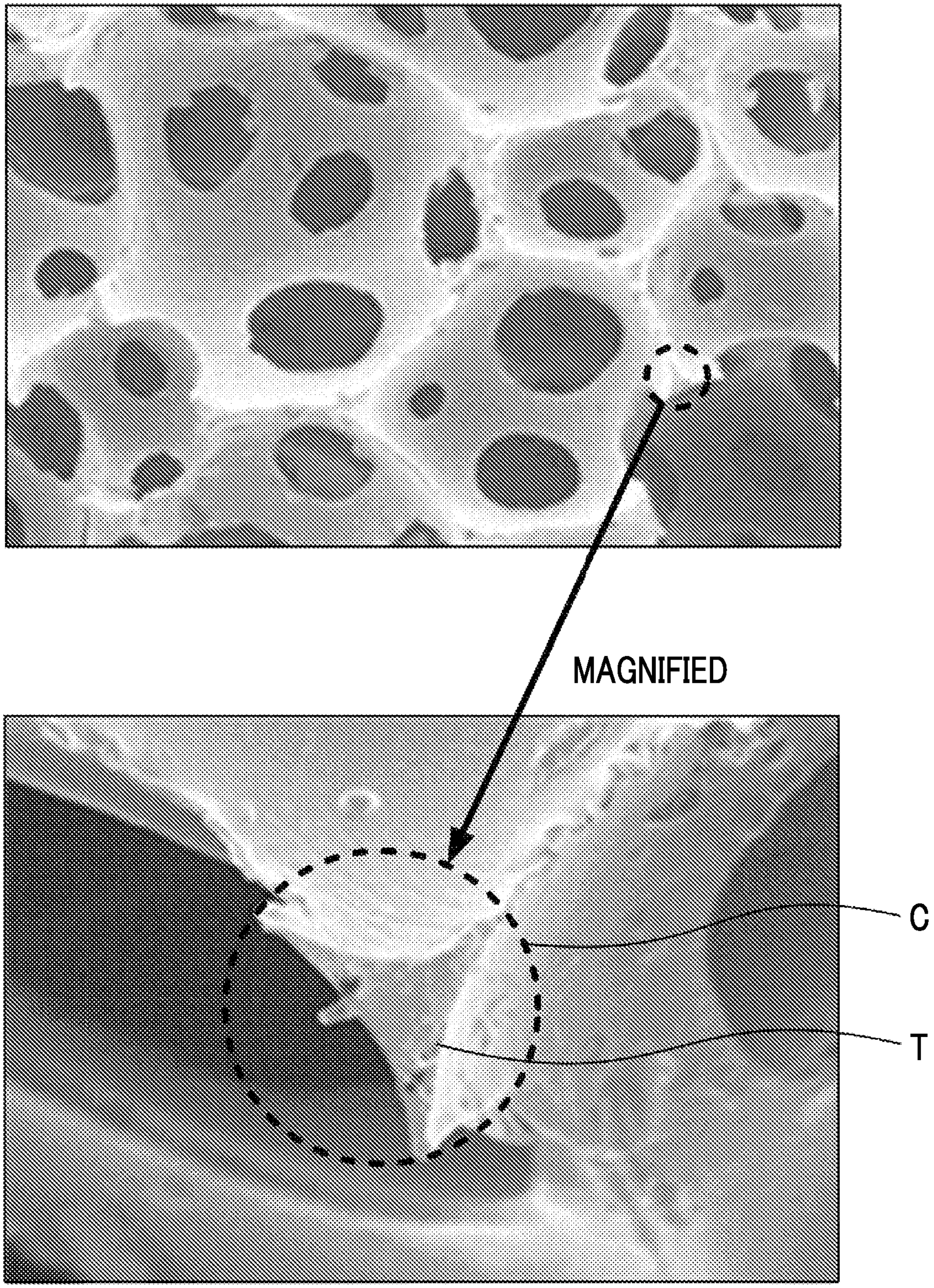
FIG. 4 is a view illustrating a diameter of a tip end portion of a cell skeleton in an elastic layer.

Here, as shown in FIG. 4, the "diameter of the tip end portion of the cell skeleton" means a diameter of a circumscribed circle C circumscribing a cross section of tip end T of a protruding portion on the surface of the foam elastic member. In addition, "the diameter of the tip end portion of the cell skeleton protruding to the surface of the elastic layer 56 is X μm or less" means that diameters of tip end portions of 80% or more of cell skeletons among the cell skeletons protruding to the surface of the elastic layer 56 are X μm or less.

The elastic layer 56 has a configuration in which the band-shaped foam elastic member is spirally disposed with a pitch. An adhesive layer such as double-sided tape is provided on an inner surface of the elastic layer 56 wound around the outer peripheral surface of the shaft 54, and the elastic layer 56 is attached to the outer peripheral surface of the shaft 54 by the adhesive layer while being spirally wound from one end portion in the axial direction to the other end portion in the axial direction of the shaft 54.

In addition, the cleaning device 50 includes the pair of bearing members 62 and 64 that rotatably support both end portions of the shaft 54. The bearing members 62 and 64 have a shape in which inner sides thereof in the axial direction of the shaft 54 are open, and outer sides thereof in the axial direction of the shaft 54 are respectively closed by side walls 62A and 64A. The bearing members 62 and 64 are respectively fixed to fixing portions 84 formed on the side plates 82 on both sides.

In addition, a gear 17 provided at the end portion of the shaft 14A of the charging roll 14 and a gear 57 provided at the end portion of the shaft 54 of the cleaning roll 52 are connected to each other. A gear diameter of the gear 57 of the cleaning roll 52 is 1.43 or more times and 3.33 or less times a gear diameter of the gear 17 of the charging roll 14.

The cleaning roll 52 is configured to rotate in conjunction with the charging roll 14 such that a peripheral speed ratio of the cleaning roll 52 to the charging roll 14 is 0.3 or more and 0.7 or less.

The cleaning roll 52 is configured so that in a case where an initial thickness of the elastic layer 56 of the cleaning roll 52 is denoted by T0, an initial thickness of the elastic layer 56 after the cleaning roll 52 is rotated by 2.8 million revolutions while being in contact with the charging roll 14 is denoted by T1, and a deformation rate of a thickness of the elastic layer 56 is denoted by $\Delta T\,\%=((T0-T1)/T0)\times 100$, $\Delta T\,\%\leq 20\%$ is satisfied.

EXAMPLES

Next, examples of the image forming apparatus will be described. FIG. 5 is a table showing the relationship between configuration contents in Examples 1 to 4 and Comparative Examples 1 to 6 and density unevenness which is an evaluation result of each example.

The following specifications are common to process cartridges mounted on the image forming apparatus of each example. A charging roll has a diameter of 12 mm and a length of 378 mm. A cleaning roll has a diameter of 9 mm and a length of 360 mm. A distance between a rotating shaft of the charging roll and a rotating shaft of the cleaning roll is 10.4 mm. A material of an elastic layer of the cleaning roll is an ester-based polyurethane, and a thickness of the elastic layer is 2.35 mm.

In the table of FIG. 5, as the configuration contents in each example, a "wound shape of a foam elastic member" in the elastic layer of the cleaning roll, a "diameter of a tip end portion of a cell skeleton" in the elastic layer of the cleaning roll, and a "peripheral speed ratio" of the cleaning roll to the charging roll.

In an example described as "spiral" in the item of the "wound shape of the foam elastic member", a width of a band of the foam elastic member in the elastic layer of the cleaning roll is 22.8 mm, and a spiral pitch is 32.2 mm. In addition, in an example described as "non-spiral" in the item of the "wound shape of the foam elastic member", the foam elastic member is disposed in a planar shape on an outer peripheral surface of a shaft of the cleaning roll.

In addition, as the evaluation result in each example, a "deformation rate of a thickness of the elastic layer" of the cleaning roll, a "thickness of a contaminant deposition layer", and "density unevenness" are shown.

Here, the "thickness of the contaminant deposition layer" is a result obtained by measuring, using scanning electron microscope (SEM) observation, a thickness of a deposition layer (contaminant deposition layer) of discharge products and/or external additives deposited on a surface of the charging roll after printing 250,000 sheets of A4 paper in the image forming apparatus. Printing of 250,000 sheets of A4 paper in the image forming apparatus corresponds to making 2.8 million revolutions of the cleaning roll 2.8 while being in contact with the charging roll.

Details of the "density unevenness" are as follows. The process cartridges prepared in each example are mounted on the image forming apparatus, and a halftone image having an image density of 40% is output on 10 sheets of A4 paper in an environment of a temperature of 10° C. and a relative humidity of 15% RH by using the image forming apparatus. Then, image quality of the last output image is evaluated. Evaluation criteria are as follows.

Evaluation Criteria

A: Image defects such as density unevenness are not present

B: Minor density unevenness has occurred

C: Density unevenness that is not acceptable in practice has occurred.

In Example 1, the "wound shape of the foam elastic member" is set to be spiral, the "diameter of the tip end portion of the cell skeleton" is set to 30 μm, and the "peripheral speed ratio" is set to 0.3. In this case, the "deformation rate of the thickness of the elastic layer" is 20%, the "thickness of the contaminant deposition layer" is 1.5 μm, and the "density unevenness" is A.

In Example 2, the "wound shape of the foam elastic member" is set to be spiral, the "diameter of the tip end portion of the cell skeleton" is set to 30 μm, and the "peripheral speed ratio" is set to 0.5. In this case, the "deformation rate of the thickness of the elastic layer" is 13%, the "thickness of the contaminant deposition layer" is 1.0 μm, and the "density unevenness" is A.

In Example 3, the "wound shape of the foam elastic member" is set to be spiral, the "diameter of the tip end portion of the cell skeleton" is set to 30 μm, and the "peripheral speed ratio" is set to 0.7. In this case, the "deformation rate of the thickness of the elastic layer" is 10%, the "thickness of the contaminant deposition layer" is 1.8 μm, and the "density unevenness" is A.

In Comparative Example 1, the "wound shape of the foam elastic member" is set to be spiral, the "diameter of the tip end portion of the cell skeleton" is set to 30 μm, and the "peripheral speed ratio" is set to 0.2. In this case, the "deformation rate of the thickness of the elastic layer" is 25%, the "thickness of the contaminant deposition layer" is 2.8 μm, and the "density unevenness" is C.

In Comparative Example 2, the "wound shape of the foam elastic member" is set to be spiral, the "diameter of the tip end portion of the cell skeleton" is set to 30 μm, and the "peripheral speed ratio" is set to 0.8. In this case, the "deformation rate of the thickness of the elastic layer" is 8%, the "thickness of the contaminant deposition layer" is 2.5 μm, and the "density unevenness" is B.

In Comparative Example 3, the "wound shape of the foam elastic member" is set to be spiral, the "diameter of the tip end portion of the cell skeleton" is set to 30 μm, and the "peripheral speed ratio" is set to 1. In this case, the "deformation rate of the thickness of the elastic layer" is 5%, the "thickness of the contaminant deposition layer" is 3.0 μm, and the "density unevenness" is C.

In Comparative Example 4, the "wound shape of the foam elastic member" is set to be non-spiral, the "diameter of the tip end portion of the cell skeleton" is set to 30 μm, and the "peripheral speed ratio" is set to 0.5. In this case, the "deformation rate of the thickness of the elastic layer" is 30%, the "thickness of the contaminant deposition layer" is 2.7 μm, and the "density unevenness" is C.

In Example 4, the "wound shape of the foam elastic member" is set to be spiral, the "diameter of the tip end portion of the cell skeleton" is set to 50 μm, and the "peripheral speed ratio" is set to 0.5. In this case, the "deformation rate of the thickness of the elastic layer" is 10%, the "thickness of the contaminant deposition layer" is 2.0 μm, and the "density unevenness" is A.

In Comparative Example 5, the "wound shape of the foam elastic member" is set to be spiral, the "diameter of the tip end portion of the cell skeleton" is set to 80 μm, and the "peripheral speed ratio" is set to 0.5. In this case, the "deformation rate of the thickness of the elastic layer" is 8%, the "thickness of the contaminant deposition layer" is 3.2 μm, and the "density unevenness" is C.

In Comparative Example 6, the "wound shape of the foam elastic member" is set to be non-spiral, the "diameter of the tip end portion of the cell skeleton" is set to 30 μm, and the "peripheral speed ratio" is set to 0.6. In this case, the "deformation rate of the thickness of the elastic layer" is 25%, the "thickness of the contaminant deposition layer" is 2.5 μm, and the "density unevenness" is B.

From a comparison between Example 2 and Comparative Example 4, it can be seen that the density unevenness can be suppressed by setting the "wound shape of the foam elastic member" to be spiral.

In addition, from a comparison between Examples 1 to 3 and Comparative Examples 1 and 2, it can be seen that the density unevenness can be suppressed by setting the "peripheral speed ratio" to 0.3 or more and 0.7 or less.

In addition, from a comparison between Example 4 and Comparative Example 5, it can be seen that the density unevenness can be suppressed by setting the "diameter of the tip end portion of the cell skeleton" to 50 μm or less.

In addition, from a comparison between Examples 2 to 3 and Comparative Example 6, it can be seen that the density unevenness can be suppressed in a configuration in which the "deformation rate of the thickness of the elastic layer" is 20% or less.

Modification Example

Although the image forming apparatus according to the exemplary embodiment of the present invention and the image forming apparatuses of the examples have been described above, the present invention is not limited to the above description and may be modified as appropriate.

Supplementary Notes

Hereinafter, supplementary notes of aspects of the present disclosure will be described.

(((1)))

A charging device comprising:

a charging member that rotates in contact with a charged body and charges the charged body; and a cleaning member that comes into contact with the charging member and rotates in conjunction with the charging member, wherein the cleaning member includes a foam elastic layer in which a band-shaped foam elastic member is spirally disposed with a pitch, and a diameter of a tip end portion of a cell skeleton protruding to a surface of the foam elastic layer is 50 μm or less, and a peripheral speed ratio of the cleaning member to the charging member is 0.3 or more and 0.7 or less.

(((2)))

The charging device according to (((1))), wherein, in a case where an initial thickness of the foam elastic layer of the cleaning member is denoted by T0, an initial thickness of the foam elastic layer after the cleaning member is rotated by 2.8 million revolutions while being in contact with the charging member is denoted by T1, and a deformation rate of a thickness of the foam elastic layer is denoted by $\Delta T\ \% = ((T0 - T1)/T0) \times 100$, $\Delta T\ \% \leq 20\%$ is satisfied.

(((3)))

The charging device according to (((2))), wherein the foam elastic layer is formed of an ester-based polyurethane.

(((4)))

The charging device according to any one of (((1))) to (((3))), wherein a gear provided at an end portion of a shaft core of the charging member and a gear provided at an end portion of a shaft core of the cleaning member are connected to each other, and the cleaning member rotates in conjunction with the charging member such that a peripheral speed ratio of the cleaning member rotates to the charging member is 0.3 or more and 0.7 or less.

(((5)))

The charging device according to (((4))), wherein a gear diameter of the cleaning member is 1.43 or more times and 3.33 or less times a gear diameter of the charging member.

(((6)))

A cartridge comprising the charging device according to any one of (((1))) to (((5))).

(((7)))

An image forming apparatus comprising:

the charging device according to any one of (((1))) to (((5))); and an image holding body as the charged body that holds an electrostatic latent image on a surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging device comprising:

a charging member configured to rotate in contact with a charged body and to charge the charged body; and a cleaning member configured to contact the charging member and to rotate in conjunction with the charging member, wherein the cleaning member includes a foam elastic layer in which a band-shaped foam elastic member is spirally disposed with a pitch, and a diameter of a tip end portion of a cell skeleton protruding to a surface of the foam elastic layer is 50 μm or less, and wherein a peripheral speed ratio of the cleaning member to the charging member is 0.3 or more and 0.7 or less.

2. The charging device according to claim 1, wherein, in a case where an initial thickness of the foam elastic layer of the cleaning member is denoted by T0, an initial thickness of the foam elastic layer after the cleaning member is rotated by 2.8 million revolutions while being in contact with the charging member is denoted by T1, and a deformation rate of a thickness of the foam elastic layer is denoted by $\Delta T\ \% = ((T0-T1)/T0) \times 100$, $\Delta T\ \% \leq 20\%$, is satisfied.

3. A cartridge comprising the charging device according to claim 2.

4. An image forming apparatus comprising:

the charging device according to claim 2; and an image holding body as the charged body configured to hold an electrostatic latent image on a surface.

5. The charging device according to claim 2, wherein the foam elastic layer is formed of an ester-based polyurethane.

6. A cartridge comprising the charging device according to claim 5.

7. An image forming apparatus comprising:

the charging device according to claim 5; and an image holding body as the charged body configured to hold an electrostatic latent image on a surface.

8. The charging device according to claim 1, wherein a gear provided at an end portion of a shaft core of the charging member and a gear provided at an end portion of a shaft core of the cleaning member are connected to each other, and wherein the cleaning member rotates in conjunction with the charging member such that a peripheral speed ratio of the cleaning member rotates to the charging member is 0.3 or more and 0.7 or less.

9. A cartridge comprising the charging device according to claim 8.

10. An image forming apparatus comprising:

the charging device according to claim 8; and an image holding body as the charged body configured to hold that holds an electrostatic latent image on a surface.

11. The charging device according to claim 8, wherein a gear diameter of the cleaning member is 1.43 or more times and 3.33 or less times a gear diameter of the charging member.

12. A cartridge comprising the charging device according to claim 11.

13. An image forming apparatus comprising:

the charging device according to claim 11; and an image holding body as the charged body configured to hold an electrostatic latent image on a surface.

14. A cartridge comprising the charging device according to claim 1.

15. An image forming apparatus comprising:

the charging device according to claim 1; and an image holding body as the charged body configured to hold an electrostatic latent image on a surface.

16. A method for a charging device, the method comprising:

rotating a charging member in contact with a charged body and charging the charged body; and contacting a cleaning member with the charging member and rotating the cleaning member in conjunction with the charging member, wherein the cleaning member includes a foam elastic layer in which a band-shaped foam elastic member is spirally disposed with a pitch, and a diameter of a tip end portion of a cell skeleton protruding to a surface of the foam elastic layer is 50 μm or less; and controlling a peripheral speed ratio of the cleaning member to the charging member to be 0.3 or more and 0.7 or less.

* * * * *